United States Patent
Moon et al.

(10) Patent No.: US 10,483,855 B2
(45) Date of Patent: Nov. 19, 2019

(54) POWER LIMIT PROTECTION FOR RESONANT POWER CONVERTER

(71) Applicant: SEMICONDUCTOR COMPONENTS INDUSTRIES, LLC, Phoenix, AZ (US)

(72) Inventors: SangCheol Moon, Bucheon (KR); Hangseok Choi, Suwon (KR); Jintae Kim, Sungnam-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/670,236

(22) Filed: Aug. 7, 2017

(65) Prior Publication Data

US 2019/0044430 A1 Feb. 7, 2019

(51) Int. Cl.
*H02M 3/335* (2006.01)
*H02M 3/337* (2006.01)
*H02M 1/00* (2006.01)

(52) U.S. Cl.
CPC ..... *H02M 3/33515* (2013.01); *H02M 3/3376* (2013.01); *H02M 2001/0029* (2013.01); *H02M 2001/0058* (2013.01)

(58) Field of Classification Search
CPC .......................................... H02M 3/315–3388
See application file for complete search history.

(56) References Cited

U.S. PATENT DOCUMENTS

| 7,855,541 | B2 * | 12/2010 | Polivka | H02M 3/33507 |
| | | | | 323/284 |
| 2015/0124489 | A1 * | 5/2015 | Dai | H02M 3/335 |
| | | | | 363/17 |
| 2016/0181927 | A1 * | 6/2016 | Chang | H02M 1/42 |
| | | | | 363/21.02 |
| 2018/0054111 | A1 * | 2/2018 | Moon | H02M 3/33515 |
| 2018/0054130 | A1 * | 2/2018 | Moon | H02M 3/33515 |

(Continued)

OTHER PUBLICATIONS

Fairchild Semiconductor Corporation, now part of ON Semiconductor, "FAN7688 Advanced Secondary Side LLC Resonant Converter Controller with Synchronous Rectifier Control" Nov. 2015.

*Primary Examiner* — Gary L Laxton
*Assistant Examiner* — Peter M Novak
(74) *Attorney, Agent, or Firm* — AMPACC Law Group, PLLC

(57) ABSTRACT

A circuit comprises an Inductor-Inductor-Capacitor (LLC) tank circuit and an energizing circuit. The LLC tank circuit includes first and second inductors, a capacitor, and a primary coil of a transformer. The first inductor is coupled in series with the second inductor, the second inductor is coupled in series with the capacitor, and the primary coil is coupled in parallel with the second inductor. The energizing circuit supplies power to the LLC tank circuit according to a switching period, and detects a power limit condition according to a value of an integrated current sense signal and a duration of the switching period. The integrated current sense signal corresponds to an integration over time of a current supplied to the LLC tank circuit. The circuit may be incorporated into a power converter to provide power limit detection according to an accurate real-time estimation of the power converter's output power.

19 Claims, 5 Drawing Sheets

(56) References Cited

U.S. PATENT DOCUMENTS

2018/0054133 A1* 2/2018 Moon ............... H02M 3/33515
2018/0054134 A1* 2/2018 Moon ............... H02M 3/33515
2018/0062383 A1* 3/2018 Kawashima ............ H02M 1/32

* cited by examiner

Normal Operation, $V_{ICS} < V_{CT}(t)|_{Ts/2}$

Power Limit Condition Operation, $V_{ICS} > V_{CT}(t)|_{Ts/2}$

Normal Operation, $V_{ICS}/t\,|_{t=T_S/2} < P_{TH}$

Power Limit Condition Operation, $V_{ICS}/t\,|_{t=T_S/2} > P_{TH}$

Normal Operation, PE $|_{t=T_s/2}$ < $P_{TH}$

Power Limit Condition Operation, PE $|_{t=T_s/2}$ > $P_{TH}$

POWER LIMIT PROTECTION FOR RESONANT POWER CONVERTER

FIELD OF THE DISCLOSURE

The present disclosure relates generally to power supply circuits, and more particularly to detecting when an output power of a power converter, for example, a Direct Current (DC) to DC resonant converter, exceeds a power limit.

BACKGROUND

The present disclosure relates, in general, to electronics, and more particularly, to circuits and method for providing power to electronic devices. Such circuits may include a DC-to-DC converter, such as a DC-to-DC Inductor-Inductor-Capacitor (LLC) resonant converter.

A DC-to-DC LLC resonant converter circuit may have a power limit to protect the circuit from being damaged by an excessive power demand, or too allow the circuit to change an operational mode in response to the power demand being high. However, in existing circuits, the power limit may be imposed based on a measurement that does not always reflect the actual amount of power being output.

For example, a DC-to-DC LLC resonant converter may detect an overpower situation (that is, may determine that the output power has exceeded the power limit) based only on an integration of a value of a primary-side current. However, the integrated primary-side current value may not accurately reflect the output power when a switching frequency of the DC-to-DC LLC resonant converter changes, since the power output may depend on both the primary-side current and the switching frequency. As a result, power protection based on only the integrated primary-side current value may from time to time be activated when the power limit has not been exceeded, or fail to be activated when the power limit has been exceeded.

Accordingly, it is desirable to provide power limit protection in a DC-to-DC LLC resonant converter according to a reliable estimate of the real output power.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
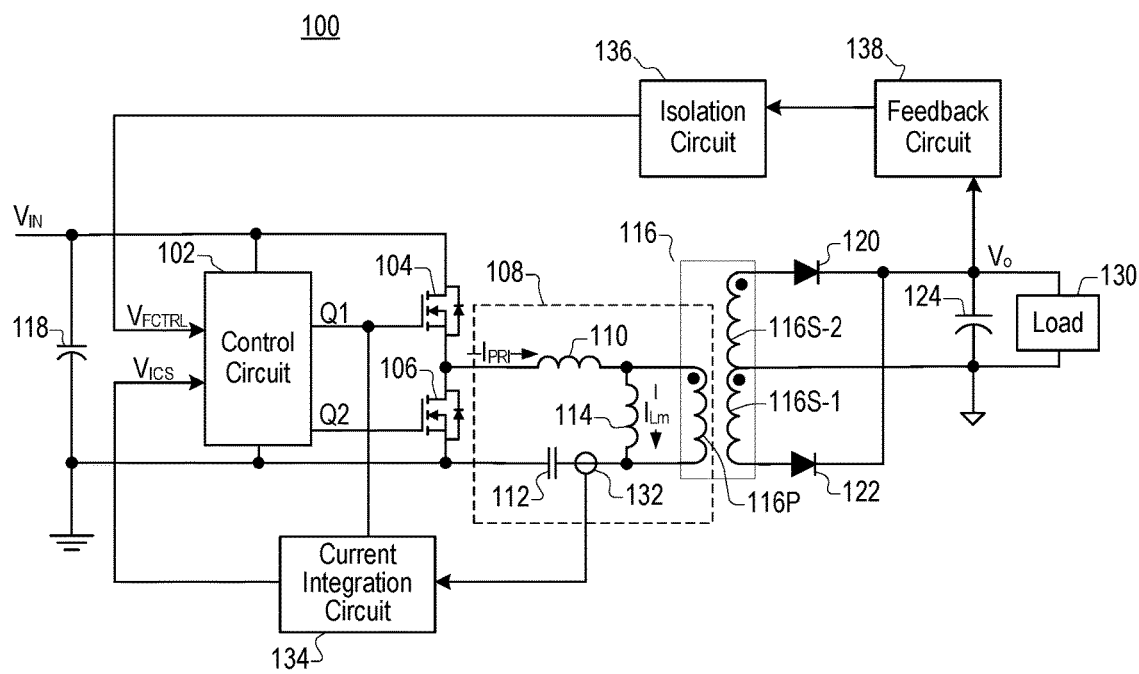
FIG. 1 illustrates a variable-frequency DC-to-DC Inductor-Inductor-Capacitor (LLC) resonant power converter (hereinafter, an LLC resonant converter) according to embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

The present disclosure relates generally to controlling power converters, and in particular to estimating an output power of a DC-to-DC Inductor-Inductor-Capacitor (LLC) resonant power converter (hereinafter, an LLC resonant converter) and detecting a power limit using said estimate.

Embodiments provide superior power limit detection in LLC resonant converters according to an accurate real-time estimation of the output power of the power converter.

In an embodiment, a control circuit determines whether a power limit of an LLC resonant converter is exceeded by comparing an integrated primary current to a power limit threshold that is a constant slope of a capacitor voltage.

In an embodiment, a control circuit determines whether a power limit of an LLC resonant converter is exceeded by comparing an integrated primary current divided by a value proportional to a switching period of the LLC resonant converter to a constant power limit threshold.

In an embodiment, a control circuit determines whether a power limit of an LLC resonant converter is exceeded by comparing a polynomial computed using an integrated primary current to a constant power limit threshold. In an embodiment, the polynomial is a linear polynomial (that is, the degree of the polynomial is one.)

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Similar reference numerals designate similar elements in the specification.

FIG. 1 illustrates a variable-frequency DC-to-DC LLC resonant converter 100 (hereinafter, power converter 100) according to embodiments. The power converter 100 receives an input voltage $V_{IN}$ and supplies an output voltage $V_O$ to a load 130. The load 130 may include one or more integrated chips (ICs). In an embodiment, the output voltage $V_O$ is used as a supply voltage to one or more of a Universal Serial Bus (USB) circuit, a Central Processing Unit (CPU), a Graphics Processing Unit (GPU), a memory integrated circuit, and the like. In an embodiment, the output voltage $V_O$ may be varied.

A primary side of the power converter 100 includes a decoupling capacitor 118, a controller circuit 102, first and second Metal Oxide Semiconductor Field Effect Transistors (MOSFETs) 104 and 106, and an LLC tank circuit 108. The LLC tank circuit 108 including a tank capacitor 112, a tank series inductor 110, a tank parallel inductor 114, and a primary coil 116P of a transformer 116. The presence of the tank parallel inductor 114 connected in parallel to the primary coil 116P distinguishes the variable-frequency DC-to-DC LLC resonant converter 100 from, for example, a series resonant power converter.

The controller circuit 102, first MOSFET 104, and second MOSFET 106 comprise an energizing circuit for supplying power to and enabling a resonating of the LLC tank circuit 108 according to a clock having a switching period $T_S$. In an embodiment, the MOSFETs 104 and 106 are n-channel power MOSFETs as shown in FIG. 1, but embodiments are not limited thereto.

A secondary side of the power converter 100 includes a first and second secondary coils 116S-1 and 116S-2 of the transformer 116, first and second diodes 120 and 122, an output capacitor 124. The secondary side receives power from the first and second secondary coils 116S-1 and 116S-2, rectifies the received power, and filters it to produce the output voltage $V_O$.

The power converter 100 includes a feedback circuit 138 and an isolation circuit 136 for producing a feedback control voltage $V_{FCTRL}$ according to the output voltage $V_O$.

The power converter 100 further includes a current sense circuit 132 and a current integration circuit 134 to produce an integrated current sense voltage $V_{ICS}$ according to an primary current $I_{PRI}$ of the LLC tank circuit 108. The current sense circuit 132 produces a signal corresponding to the primary current $I_{PRI}$ flowing in the LLC tank circuit 108. The current integration circuit 134 integrates the values of the signal produced by the current sense circuit 132 over time to produce the integrated current sense voltage $V_{ICS}$.

Figure 2:
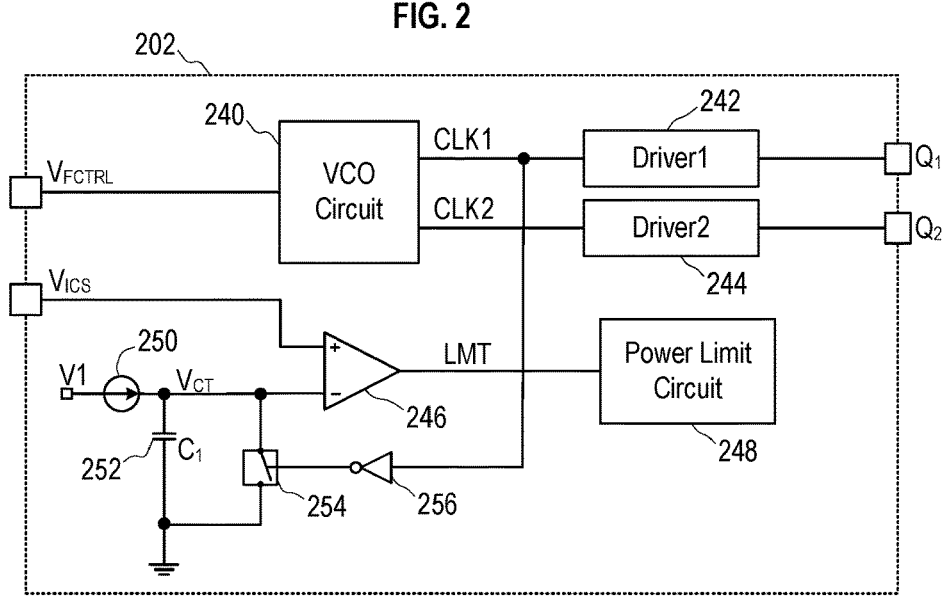
FIG. 2 illustrates a control circuit suitable for use in an LLC resonant converter according to an embodiment.

In an embodiment, instead of using the current sense circuit 132 and the current integration circuit 134, the integrated current sense voltage $V_{ICS}$ is obtained by measuring a voltage $V_{CR}$ across the tank capacitor 112 when CLK1 is asserted in FIG. 2.

In an embodiment, the integrated current sense voltage $V_{ICS}$ may be produced according to a state of the first drive signal Q1. For example, the integrated current sense voltage $V_{ICS}$ may be reset to a zero value when the first drive signal Q1 has a value that turns the first MOSFET 104 off, and may have a value corresponding to an integral over time of the primary current $I_{PRI}$, as measured by the current sense circuit 132, when the first drive signal Q1 has a value that turns the first MOSFET 104 on.

The primary side controller circuit 102 generates first and second drive signals Q1 and Q2 that are square waves that are 180 degrees out of phase. A frequency of the first and second drive signals Q1 and Q2 may vary according to, for example, the feedback control voltage $V_{FCTRL}$. In an illustrative embodiment, the frequency of the first and second drive signals Q1 and Q2 may vary between 100 KHz and 200 KHz.

Using the first and second drive signals Q1 and Q2, the primary side controller circuit 102 first supplies energy from the input voltage $V_{IN}$ to the LLC tank circuit 108 by turning on the first MOSFET 104 and turning off the second MOSFET 106. The primary side controller circuit 102 then allows the LLC tank circuit 108 to resonate, that is, it connects the components of the LLC tank circuit 108 in a loop circuit so that energy can flow between the components of the LLC tank circuit 108, by turning off the first MOSFET 104 and turning on the second MOSFET 106.

The transformer 116 of the power converter 100 is a center-tap transformer including the first and second secondary coils 116S-1 and 116S-2. Polarities of voltages across the first and second secondary coils 116S-1 and 116S-2, relative to the center tap, will be opposite each other.

The secondary side of the power converter 100 includes the output capacitor 124 which is used to provide the output voltage $V_{OUT}$ to the load 130. Current is provided to the output capacitor 124 using the first and second diodes 120 and 122.

Although FIG. 1 illustrates a partitioning of the power converter 100 into specific blocks, embodiments are not limited thereto. For example, in an embodiment, the control circuit 102 and the current integration circuit 134 may be included in a same integrated circuit.

FIG. 2 illustrates a control circuit 202 suitable for use in a LLC resonant converter according to an embodiment. The control circuit 202 may be included in the control circuit 102 of the power converter 100 of FIG. 1. The control circuit 202 receives a feedback control voltage $V_{FCTRL}$ and an integrated current sense voltage $V_{ICS}$, and produces first and second drive signals Q1 and Q2.

The control circuit 202 includes a Voltage Controlled Oscillator circuit (VCO) 240, first and second driver circuits 242 and 244, a comparator 246, and a power limit circuit 248. The VCO 240 produces first and second clock signals CLK1 and CLK2 corresponding to opposite phases of the VCO 240. A frequency of the first and second clock signals CLK1 and CLK2 varies according to the feedback control voltage $V_{FCTRL}$. In an embodiment, the frequency of the first and second clock signals CLK1 and CLK2 may vary in a range between 100 KHz and 200 KHz according the value of the feedback control voltage $V_{FCTRL}$.

The first driver circuit 242 produces the first drive signal Q1 according to the first clock signal CLK1. The second driver circuit 244 produces the second drive signal Q2 according to the first clock signal CLK2. In an embodiment, the first and second driver circuits 242 and 244 comprise buffers.

The control circuit 202 further includes a comparator 246 generating a limit signal LMT and a power limit circuit 248 that receives the limit signal LMT. When the limit signal LMT is asserted, the power limit circuit 246 performs a predetermined action as a response to too much power being drawn from the power converter that the control circuit 202 is included in. For example, in an embodiment, the power limit circuit 246 may increase frequencies of the first and second clock signals CLK1 and CLK2 in response to the limit signal LMT being asserted.

The control circuit 202 further includes a current source 250 coupled to an internal supply voltage V1, a capacitor 252, a switch device 254, and an inverter 256, which operate to produce a ramp signal $W_{CT}$. The ramp signal $V_{CT}$ is reset to a ground voltage when the first clock signal CLK1 is de-asserted, corresponding, for example, to an interval when the first MOSFET 104 of the power converter 100 of FIG. 1 is off. The ramp signal $V_{CT}$ has a value that increases at a rate determined by a value of a current produced by the current source 250 and by a capacitance of the capacitor 252.

The comparator 246 produces the limit signal LMT be comparing a value of the integrated current sense voltage $V_{ICS}$ to the value of the ramp signal $V_{CT}$. Accordingly, the ramp signal $V_{CT}$ operates as a constant dv/dt slope threshold $P_{TH}$. The comparator 246 de-asserts the limit signal LMT when the value of the integrated current sense voltage $V_{ICS}$ is less than the value of the ramp signal $V_{CT}$. The comparator 246 asserts the limit signal LMT when the value of the integrated current sense voltage $V_{ICS}$ is greater than the value of the ramp signal $V_{CT}$.

The control circuit 202 operates according to an estimate of the power output being produced by the power converter it is included in. The power estimation signal PE is equal to:

$$PE = V_{IN} \times avg(I_{PRI}) = V_{IN} \times \frac{2}{T_S} \int_0^{T_S/2} I_{PRI}\, dt \qquad \text{Equation 1}$$

wherein a switching period $T_S$ is a duration of one cycle of the VCO 240. Accordingly, the circuit is in a normal operation (that is, below a power limit PLIM) when:

$$\int_0^{T_S/2} I_{PRI}\, dt < PLIM \times \frac{t}{V_{IN}} \bigg|_{t=T_S/2} \qquad \text{Equation 2}$$

When the constant dv/dt slope threshold $P_{TH}$ has a value equal to the power limit PLIM multiplied by the time elapsed since the start of the integration period and divided by the input voltage $V_{IN}$ (that is, $P_{TH}=PLIM \times t/V_{IN}$) the circuit is in the normal operation when:

$$\int_0^{T_S/2} I_{PRI}\, dt < P_{TH}|t=T_S/2 \qquad \text{(Equation 3)}$$

and the circuit being in the power limit condition is detected when:

$$\int_0^{T_S/2} I_{PRI}\, dt > P_{TH}|t=T_S/2 \qquad \text{(Equation 4)}$$

Note that unlike other circuits known in the art, the use of the constant dv/dt slope threshold $P_{TH}$ automatically takes into account the change in the output power, relative to the primary current $I_{PRI}$, caused by changes in the frequency of the VCO 240. In particular, as the frequency of the VCO 240 increases and the switching period $T_S$ decreases correspondingly, the value of the constant dv/dt slope threshold $P_{TH}$ is not changed, so that a lower value of the integrated current sense voltage $V_{ICS}$ at $t=T_S$ triggers the limit signal LMT.

Figure 3:
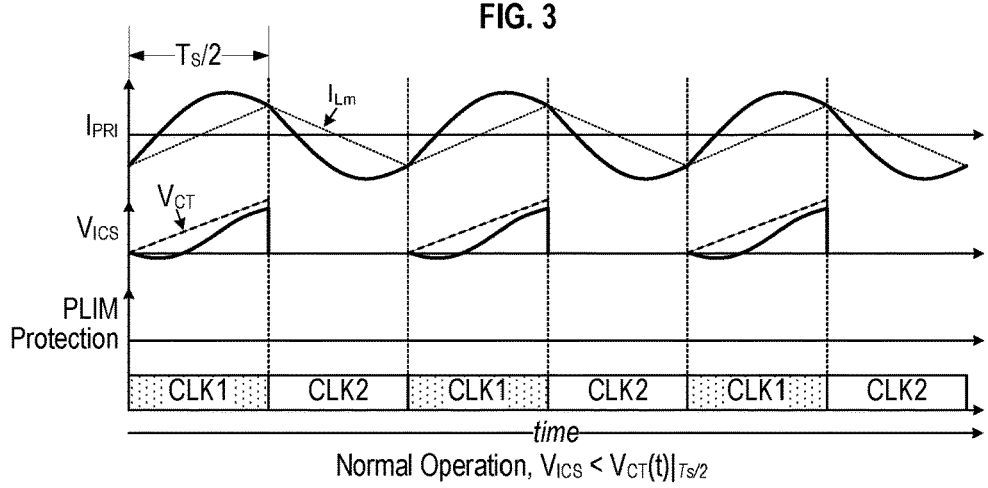
FIG. 3 includes waveforms illustrating operation of the control circuit of FIG. 2 during a normal operation, according to an embodiment.

FIG. 3 includes waveforms illustrating operation of the control circuit 202 of FIG. 2 during a normal operation, according to an embodiment. In the embodiment, the control circuit 202 is operating in the power converter 100 of FIG. 1.

The waveforms of FIG. 3 illustrate values of the primary side current $I_{PRI}$, the inductor current $I_{Lm}$ corresponding to the current through the tank parallel inductor 114, the integrated current sense voltage $V_{ICS}$, and the ramp signal $V_{CT}$. Also illustrated in FIG. 3 is a PLIM Protection signal that is asserted when the power limit circuit 248 has sensed an over-power condition and a signal indicating which of the first or second clock signals CLK1 or CLK2 are asserted.

As shown in FIG. 3, during normal operation, the value of the integrated current sense voltage $V_{ICS}$ does not exceed the value of the ramp signal $V_{CT}$ at any time during the interval ($0<t<T_S/2$) when the first clock CLK1 is asserted, that is, during the interval when power is supplied to the LLC tank circuit 108 from the input voltage $V_{IN}$. Accordingly, the PLIM Protection signal is not asserted.

Figure 4:
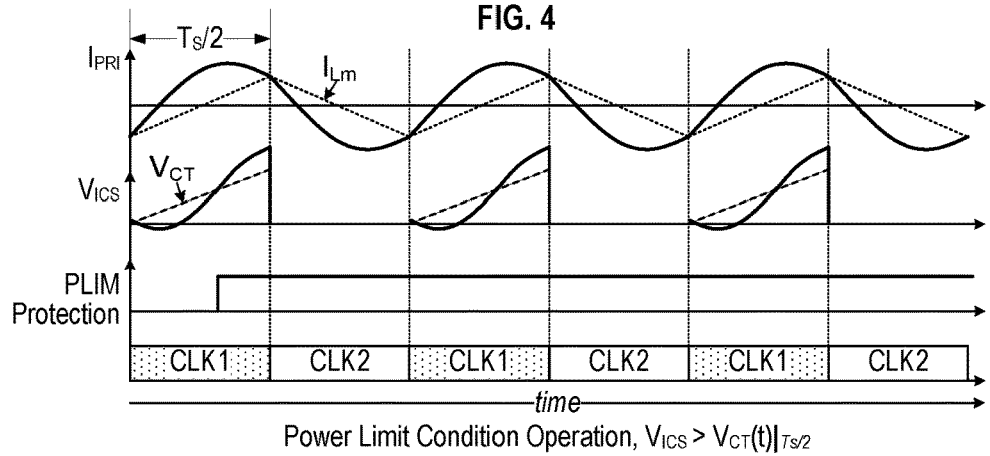
FIG. 4 includes waveforms illustrating operation of the control circuit of FIG. 2 during a power limit condition operation, according to an embodiment.

FIG. 4 includes waveforms illustrating operation of the control circuit 202 of FIG. 2 during a power limit condition operation, according to an embodiment. The waveforms of FIG. 4 illustrate the same values as those of FIG. 3, described above.

As shown in FIG. 4, during operation when a power limit condition is present, the value of the integrated current sense voltage $V_{ICS}$ exceed the value of the ramp signal $V_{CT}$ during the interval when the first clock CLK1 is asserted. Accordingly, the PLIM Protection signal is asserted. In an embodiment, once asserted, the PLIM Protection signal remains asserted until an entire interval when the first clock CLK1 is asserted passes without the integrated current sense voltage $V_{ICS}$ exceeding the value of ramp signal $V_{CT}$.

Figure 5:
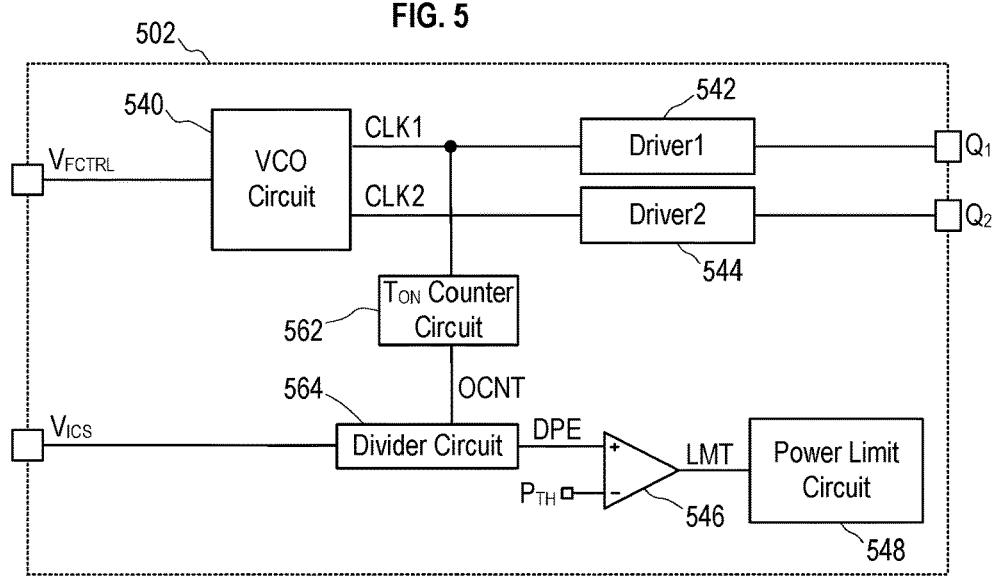
FIG. 5 illustrates a control circuit suitable for use in an LLC resonant converter according to an embodiment.

FIG. 5 illustrates a control circuit 502 suitable for use in a LLC resonant converter according to an embodiment. The control circuit 502 may be included in the control circuit 102 of the variable-frequency LLC resonant converter 100 of FIG. 1. Features in FIG. 5 having reference characters 5XX for which features exist in FIG. 2 having reference characters 2XX correspond to those features in FIG. 2, and in the interest of brevity will not be described again. For example, the VCO 540 of FIG. 5 corresponds to the similarly numbered VCO 240 of FIG. 2.

The control circuit 502 includes an on time counter circuit 562 and a divider circuit 564. The on time counter circuit 562 has an on count signal OCNT that is reset to zero when the first clock CLK1 is de-asserted and incremented from the zero when the first clock CLK1 is asserted. The divider circuit 564 divides a value of the integrated current sense voltage $V_{ICS}$ by the count of the on time counter circuit 562 to produce a value of a divided power estimation signal DPE. In an embodiment, the divider circuit 564 is a programmable voltage divider circuit.

The control circuit 502 operates according to an estimate of the power output being produced by the power converter it is included in. The power estimation PE for the output power is equal to:

$$PE = V_{IN} \times avg(I_{PRI}) = V_{IN} \times \frac{2}{T_S} \int_0^{T_S/2} I_{PRI}\, dt \qquad \text{Equation 5}$$

wherein the switching period $T_S$ is a duration of one cycle of the VCO 540. Accordingly, the circuit is in a normal operation (that is, below a power limit PLIM) when:

$$\frac{2}{T_S} \int_0^{T_S/2} I_{PRI}\, dt < PLIM \times \frac{t}{V_{IN}} \qquad \text{Equation 6}$$

In the control circuit 502, the value of on count signal OCNT corresponds to $T_S/2$ at the end of the interval when the first clock CLK1 is on; that is, at $t=T_S$, $1/OCNT=2/T_S$. When the time t since the first clock CLK1 was asserted is less than $T_S/2$, OCNT corresponds to the time t. When a power threshold $P_{TH}$ has a value equal to the power limit PLIM divided by the input voltage $V_{IN}$ (that is, $P_{TH}=PLIM \times 1/V_{IN}$) the circuit is in the normal operation when:

$$\frac{1}{t}\int_0^{T_S/2} I_{PRI}\, dt < P_{TH} \qquad \text{Equation 6}$$

that is, when the integrated current sense voltage $V_{ICS}$ divided by the on count signal OCNT is less than the power threshold $P_{TH}$, and the circuit being in the power limit condition is detected when:

$$\frac{1}{t}\int_0^{T_S/2} I_{PRI}\, dt > P_{TH} \qquad \text{Equation 7}$$

that is, when the integrated current sense voltage $V_{ICS}$ divided by the on count signal OCNT is greater than the power threshold $P_{TH}$.

Note that unlike other circuits known in the art, dividing the integrated current sense voltage $V_{ICS}$ by the value of the on count signal OCNT automatically takes into account the change in the output power, relative to the primary current $I_{PRI}$, caused by changes in the frequency of the VCO 540.

Figure 6:
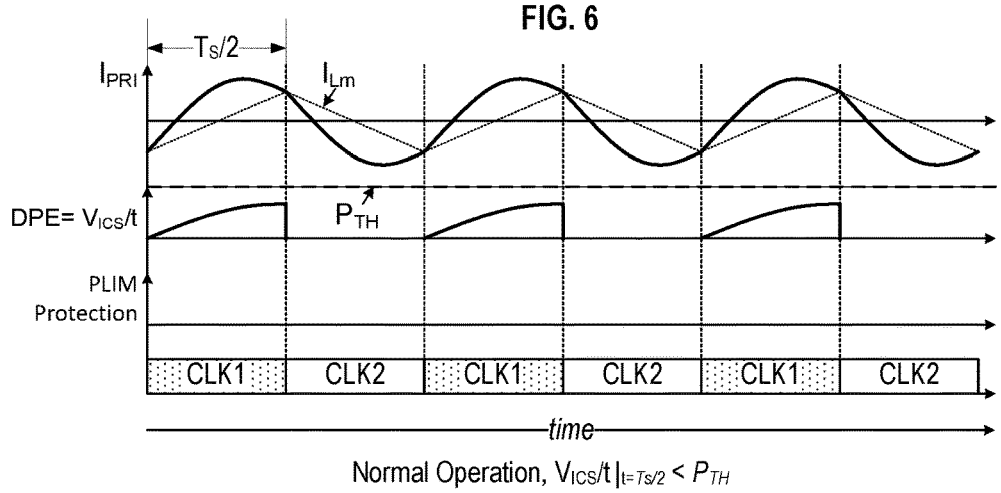
FIG. 6 includes waveforms illustrating operation of the control circuit of FIG. 5 during a normal operation, according to an embodiment.

FIG. 6 includes waveforms illustrating operation of the control circuit 502 of FIG. 5 during a normal operation, according to an embodiment. In the embodiment, the control circuit 502 is operating in the power converter 100 of FIG. 1. The waveforms of FIG. 6 illustrate the same values as those of FIG. 3, described above, except that FIG. 6 shows a constant power threshold $P_{TH}$ and shows the divided power estimation signal DPE corresponding to the integrated current sense voltage $V_{ICS}$ divided by the value of the on count (i.e. by t) instead of the value of the integrated current sense voltage $V_{ICS}$.

As shown in FIG. 6, during normal operation, the value of the integrated current sense voltage $V_{ICS}$ divided by t (that is, the value of the divided power estimation signal DPE) does not exceed the value of the power threshold $P_{TH}$ at any time during the interval when the first clock CLK1 is on, and the PLIM Protection signal is not asserted.

Figure 7:
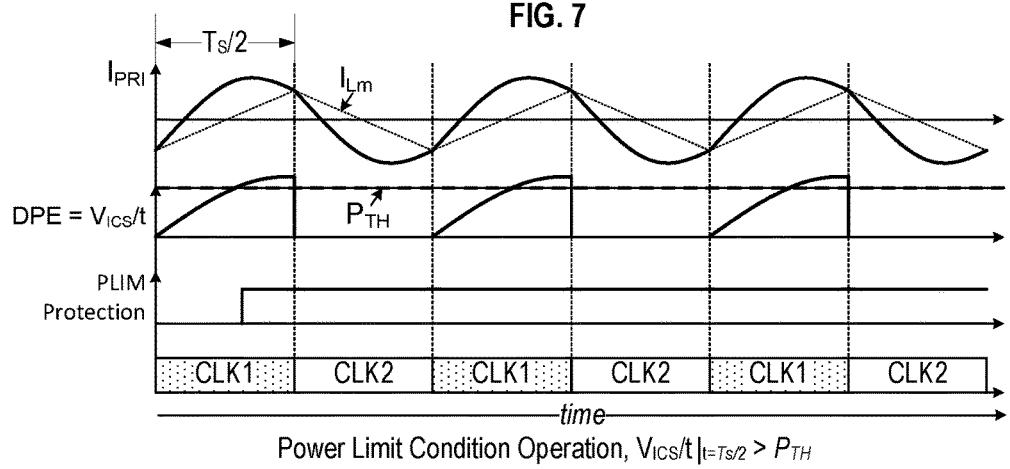
FIG. 7 includes waveforms illustrating operation of the control circuit of FIG. 5 during a power limit condition operation, according to an embodiment.

FIG. 7 includes waveforms illustrating operation of the control circuit 502 of FIG. 5 during a power limit condition operation, according to an embodiment. The waveforms of FIG. 7 illustrate the same values as those of FIG. 6, described above.

As shown in FIG. 7, during operation when a power limit condition is present, the value of the integrated current sense voltage $V_{ICS}$ divided by t (that is, the value of the divided power estimation signal DPE) exceeds the value of the power threshold $P_{TH}$ during the interval when the first clock CLK1 is on. Accordingly, the PLIM Protection signal is asserted. In an embodiment, once asserted, the PLIM Protection signal remains asserted until an entire interval when the first clock CLK1 is on passes without the value of the divided power estimation signal DPE exceeding the value of the power threshold $P_{TH}$.

Figure 8:
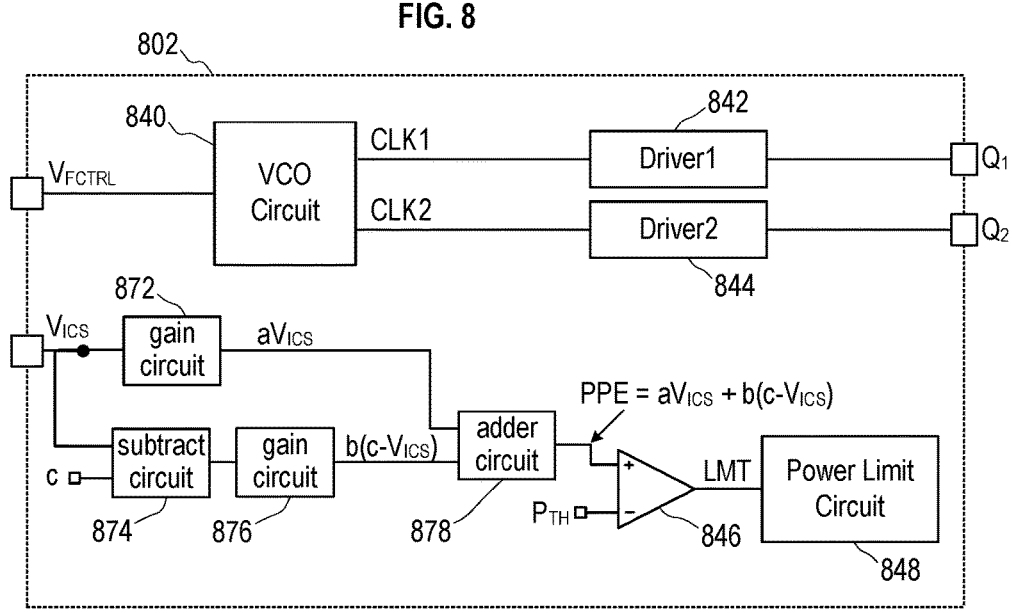
FIG. 8 illustrates a control circuit suitable for use in an LLC resonant converter according to an embodiment.

FIG. 8 illustrates a control circuit 802 suitable for use in a LLC resonant converter according to an embodiment. The control circuit 802 may be included in the control circuit 102 of the variable-frequency DC-to-DC LLC resonant converter 100 of FIG. 1. Features in FIG. 8 having reference characters 8XX for which features exist in FIG. 2 having reference characters 2XX correspond to those features in FIG. 2, and in the interest of brevity will not be described again. For example, the VCO 840 of FIG. 8 corresponds to the similarly numbered VCO 240 of FIG. 2.

The control circuit 802 include first and second gain circuits 872 and 876, a subtract circuit 874, and an adder circuit 878. The first gain circuit 872 generates a scaled output a $V_{ICS}$ by multiplying the value of the integrated current sense signal $V_{ICS}$ by a first constant a. The subtract circuit 874 has an output equal to a third constant c minus the value of the integrated current sense voltage $V_{ICS}$, which output is multiplied by a second constant b by the second gain circuit 876 to produce the negated scaled output b(c−$V_{ICS}$). The adder circuit adds the scaled output a $V_{ICS}$ to the negated scaled output b(c−$V_{ICS}$) to produce a polynomial power estimation signal PPE equal to a×$V_{ICS}$+b×(c−$V_{ICS}$).

Figure 9:
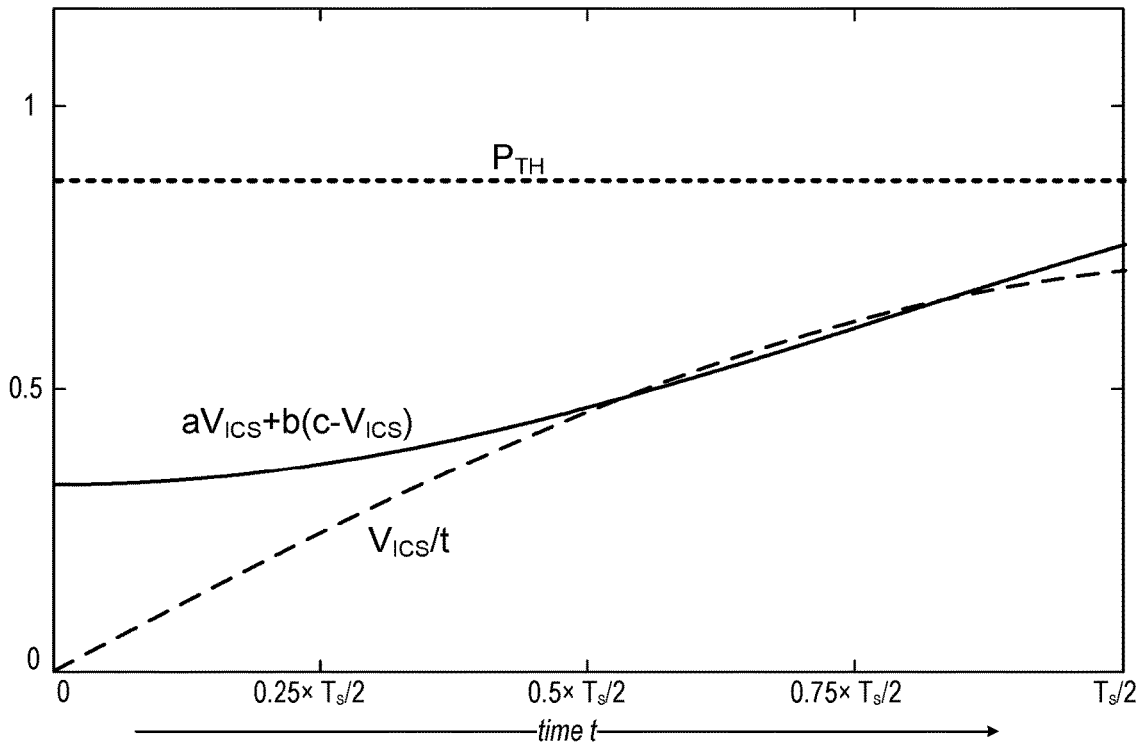
FIG. 9 illustrates a polynomial approximation to dividing an integrated current sense voltage by a time, according to an embodiment.

As shown in FIG. 9, for appropriate values of the first, second, and third constants a, b, and c, the polynomial power estimation signal PPE equal to a×$V_{ICS}$+b×(c−$V_{ICS}$) approximates the value of the integrated current sense signal $V_{ICS}$ divided by the time t when t at around one-half the switching period $T_S$ of one cycle of the VCO 840. The appropriate values of the first, second, and third constants a, b, and c may be determined by techniques known to the art.

For example, in an illustrative embodiment in which the value of the integrated current sense voltage $V_{ICS}$ corresponds to 1−cos(t), a may be set to 1, b may be set to 0.7, and c may be set to 0.47.

The control circuit 802 operates according to an estimate of the power output being produced by the power converter it is included in. The polynomial power estimation signal PPE approximates the value of the integrated current sense signal $V_{ICS}$ divided by the time t, and is equal to:

$$\text{PPE}=a\times\int_0^{T_S/2} I_{PRI}\, dt + b\times(c-\int_0^{T_S/2} I_{PRI}\, dt) \qquad \text{Equation 8}$$

for a range of 0<t<Ts/2, wherein a switching period $T_S$ is a duration of one cycle of the VCO 840. When a power threshold $P_{TH}$ has a value equal to the power limit PLIM divided by the input voltage $V_{IN}$ (that is, $P_{TH}$=PLIM×1/$V_{IN}$) the circuit is in the normal operation when:

$$a\times\int_0^{T_S/2} I_{PRI}\, dt + b\times(c-\int_0^{T_S/2} I_{PRI}\, dt) < P_{TH} \qquad \text{Equation 9}$$

and the circuit being in the power limit condition is detected when:

$$a\times\int_0^{T_S/2} I_{PRI}\, dt + b\times(c-\int_0^{T_S/2} I_{PRI}\, dt) > P_{TH} \qquad \text{Equation 10}$$

Note that unlike other circuits known in the art, approximating the integrated current sense voltage $V_{ICS}$ divided by the time t using a polynomial for a range automatically takes into account the change in the output power, relative to the primary current $I_{PRI}$, caused by changes in the frequency of the VCO 840.

Figure 10:
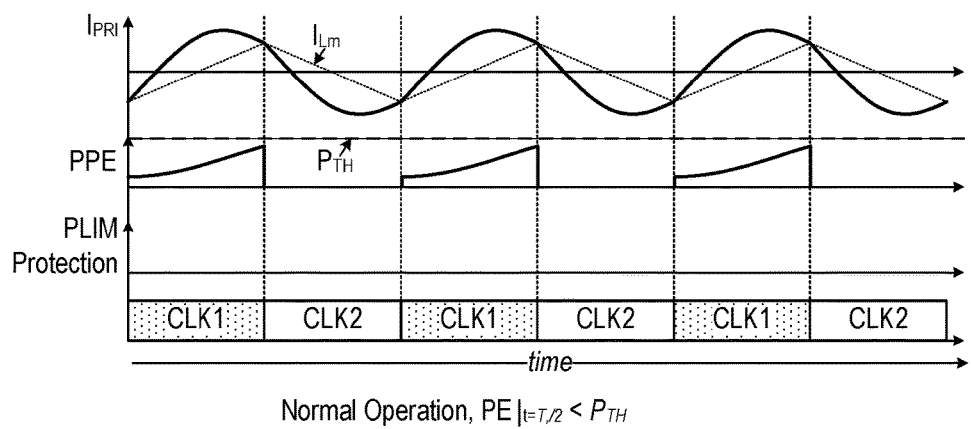
FIG. 10 includes waveforms illustrating operation of the control circuit of FIG. 8 during a normal operation, according to an embodiment.

FIG. 10 includes waveforms illustrating operation of the control circuit 802 of FIG. 8 during a normal operation, according to an embodiment. In the embodiment, the control circuit 802 is operating in the power converter 100 of FIG. 1. The waveforms of FIG. 8 illustrate the same values as those of FIG. 6, described above, except that FIG. 8 shows the polynomial power estimation signal PPE corresponding to a×$V_{ICS}$+b×(c−$V_{ICS}$) instead of the integrated current sense voltage $V_{ICS}$ divided by t.

As shown in FIG. 10, during normal operation, the value of the polynomial power estimation signal PPE does not exceed the value of the power threshold $P_{TH}$ at any time during the interval when the first clock CLK1 is on, and the PLIM Protection signal is not asserted.

Figure 11:
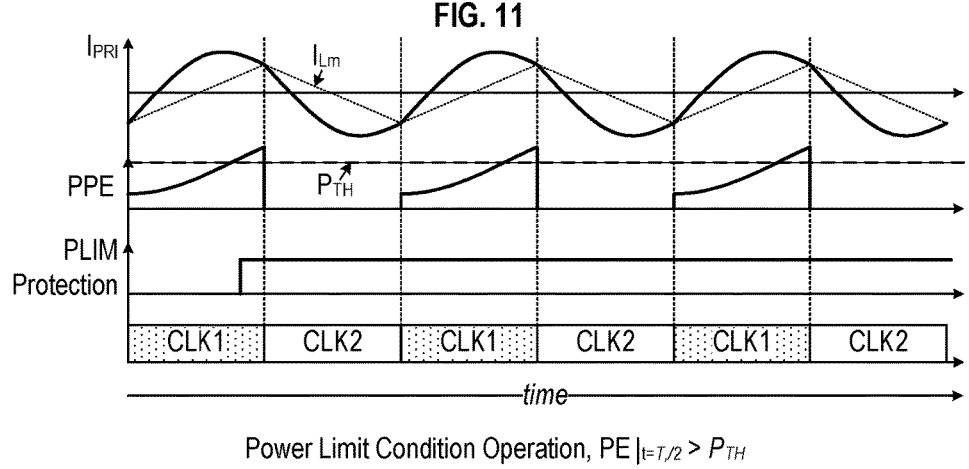
FIG. 11 includes waveforms illustrating operation of the control circuit of FIG. 8 during a power limit condition operation, according to an embodiment.

FIG. 11 includes waveforms illustrating operation of the control circuit 802 of FIG. 8 during a power limit condition operation, according to an embodiment. The waveforms of FIG. 10 illustrate the same values as those of FIG. 10, described above.

As shown in FIG. 11, during operation when a power limit condition is present, the value of the polynomial power estimation signal PPE exceeds the value of the power threshold $P_{TH}$ during the interval when the first clock CLK1 is on. Accordingly, the PLIM Protection signal is asserted. In an embodiment, once asserted, the PLIM Protection signal remains asserted until an entire interval when the first clock CLK1 is on passes without the polynomial power estimation signal PPE exceeding the value of the power threshold $P_{TH}$.

Embodiments operate to produce an estimate of an output power of a power converter according to a primary current of the power converter, wherein the estimate of the power output takes into account a variable frequency of the power converter. In embodiments, a power limit is detected using the estimate of the output power. As a result, the power limit is triggered at a same output power level, regardless of changes in that primary current, and operating frequency of the power converter. In embodiments, the power converter is an LLC resonant converter, such as a DC-to-DC LLC resonant power converter.

In an embodiment, an integrated current of the primary side is compared with the constant dv/dt slope threshold.

In an embodiment, an integrated current of the primary side is divided by a switching interval of the primary side and compared with a predetermined power limit threshold.

In an embodiment, an integrated current compensated using a polynomial is compared with a predetermined power limit threshold.

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. An electronic circuit comprising:
   an Inductor-Inductor-Capacitor (LLC) tank circuit comprising a first inductor, a second inductor, a capacitor, and a primary coil of a transformer, wherein the first inductor is coupled in series with the second inductor, the second inductor is coupled in series with the capacitor, and the primary coil of the transformer is coupled in parallel with the second inductor; and
   an energizing circuit to supply power to the LLC tank circuit according to a switching period and to detect a power limit condition, wherein the power limit condition is detected according to a value of an integrated current sense signal and a duration of the switching period, wherein the integrated current sense signal corresponds to an integration over time of a current supplied to the LLC tank circuit by a first switch, and wherein the energizing circuit comprises:
      an oscillator to receive a feedback signal and to generate a clock signal having the switching period according to the feedback signal;
      the first switch to supply power to the LLC tank circuit from an input voltage during a first phase of the clock signal;
      a second switch to configure components of the LLC tank circuit in a loop circuit during a second phase of the clock signal;
      a ramp signal generation circuit to generate a constant dv/dt threshold signal according to the switching period; and
      a comparator circuit to detect the power limit condition according to a comparison of the constant dv/dt threshold signal and the integrated current sense signal.

2. The electronic circuit of claim 1, wherein the integrated current sense signal corresponds to a voltage across the capacitor.

3. The electronic circuit of claim 1, further comprising:
   a current sense circuit to generate a current sense signal corresponding to a value of a current supplied to the LLC tank circuit by the energizing circuit; and
   an integrator circuit to generate the integrated current sense signal by integrating the current sense signal over time.

4. The electronic circuit of claim 1, wherein the ramp signal generation circuit increases a signal at a predetermined constant rate during an interval of the switching period, the interval corresponding to a period of time when the energizing circuit is to supply power to the LLC tank circuit.

5. The electronic circuit of claim 4, wherein the ramp signal generation circuit sets the threshold signal to a predetermined constant when the energizing circuit is not supplying power to the LLC tank circuit.

6. The electronic circuit of claim 5, wherein the predetermined constant is zero volts.

7. The electronic circuit of claim 1, wherein the LLC tank circuit and the energizing circuit are included in a primary side of an LLC resonant converter.

8. An electronic circuit comprising:
   an Inductor-Inductor-Capacitor (LLC) tank circuit comprising a first inductor, a second inductor, a capacitor, and a primary coil of a transformer, wherein the first inductor is coupled in series with the second inductor, the second inductor is coupled in series with the capacitor, and the primary coil of the transformer is coupled in parallel with the second inductor; and
   an energizing circuit to supply power to the LLC tank circuit according to a switching period and to detect a power limit condition, wherein the power limit condition is detected according to a value of an integrated current sense signal and a duration of the switching period, wherein the integrated current sense signal corresponds to an integration over time of a current supplied to the LLC tank circuit by a first switch, and wherein the energizing circuit comprises:
      an oscillator to receive a feedback signal and to generate a clock signal having the switching period according to the feedback signal;
      the first switch to supply power to the LLC tank circuit from an input voltage during a first phase of the clock signal;
      a second switch to configure components of the LLC tank circuit in a loop circuit during a second phase of the clock signal;
      a counter circuit to generate a count according to the switching period;
      a divider circuit to produce a power estimation signal by dividing the integrated current sense signal by the count; and a comparator circuit to detect the power limit condition according to a comparison of the power estimation signal to a power limit threshold having a predetermined value.

9. The electronic circuit of claim 8, wherein the count corresponds to a time since a start of an interval of the switching period, the interval corresponding to a period of time when the energizing circuit is to supply power to the LLC tank circuit.

10. The electronic circuit of claim 8, wherein the LLC tank circuit and the energizing circuit are included in a primary side of an LLC resonant converter.

11. An electronic circuit comprising:
a Inductor-Inductor-Capacitor (LLC) tank circuit comprising a first inductor, a second inductor, a capacitor, and a primary coil of a transformer, wherein the first inductor is coupled in series with the second inductor, the second inductor is coupled in series with the capacitor, and the primary coil of the transformer is coupled in parallel with the second inductor; and
an energizing circuit to supply power to the LLC tank circuit according to a switching period and to detect a power limit condition, wherein the power limit condition is detected according to a value of an integrated current sense signal and a duration of the switching period, wherein the integrated current sense signal corresponds to an integration over time of a current supplied to the LLC tank circuit by a first switch, and wherein the energizing circuit comprises:
an oscillator to receive a feedback signal and to generate a clock signal having the switching period according to the feedback signal;
the first switch to supply power to the LLC tank circuit from an input voltage during a first phase of the clock signal;
a second switch to configure components of the LLC tank circuit in a loop circuit during a second phase of the clock signal;
a polynomial calculation circuit to generate a power estimation signal by evaluating a polynomial using a value of the integrated current sense signal; and
a comparator circuit to detect the power limit condition according to a comparison of the power estimation signal to a power limit threshold having a predetermined value.

12. The electronic circuit of claim 11, wherein the polynomial evaluated by the polynomial calculation circuit is a linear polynomial.

13. The electronic circuit of claim 11, wherein the polynomial calculation circuit comprises:
a first gain circuit to produce a first scaled output by multiplying the integrated current sense signal by a first predetermined value;
a subtract circuit to produce a negated offset output by subtracting the integrated current sense signal from a second predetermined value;
a second gain circuit to produce a second scaled output by multiplying the negated offset output by a third predetermined value; and
an adder circuit to produce the power estimation signal by adding the first scaled output to the second scaled output.

14. The electronic circuit of claim 11, wherein the LLC tank circuit and the energizing circuit are included in a primary side of an LLC resonant converter.

15. A method of controlling an Inductor-Inductor-Capacitor (LLC) resonant converter having a variable switching frequency, the method comprising:
determining an integrated current sense signal corresponding to an integration over time of a value of a primary-side current of the LLC resonant converter; and
determining, using the integrated current sense signal, a power limit condition according to an accurate real-time estimate of the output power of the LLC resonant converter, wherein determining the power limit condition comprises:
generating a constant dv/dt threshold signal corresponding to a period of the switching frequency; and
comparing the constant dv/dt threshold signal to the integrated current sense signal.

16. The method of claim 15, wherein determining the integrated current sense signal comprises measuring a voltage across a capacitor included in an LLC tank circuit of the LLC resonant converter.

17. The method of claim 15, wherein determining the integrated current sense signal comprises:
generating a current sense signal according to a current being supplied to an LLC tank circuit of the LLC resonant converter; and
integrating the current sense signal over time.

18. A method of controlling an Inductor-Inductor-Capacitor (LLC) resonant converter having a variable switching frequency, the method comprising:
determining an integrated current sense signal corresponding to an integration over time of a value of a primary-side current of the LLC resonant converter; and
determining, using the integrated current sense signal, a power limit condition according to an accurate real-time estimate of the output power of the LLC resonant converter, wherein determining the power limit condition comprises:
generating a count corresponding to a duration of a period of the switching frequency;
generating a power estimation signal by dividing a value of the integrated current sense signal by the count; and
comparing a threshold signal having a predetermined value to the power estimation signal.

19. A method of controlling an Inductor-Inductor-Capacitor (LLC) resonant converter having a variable switching frequency, the method comprising:
determining an integrated current sense signal corresponding to an integration over time of a value of a primary-side current of the LLC resonant converter; and
determining, using the integrated current sense signal, a power limit condition according to an accurate real-time estimate of the output power of the LLC resonant converter, wherein determining the power limit condition comprises:
generating a power estimation signal by evaluating a polynomial according to a value of the integrated current sense signal; and
comparing a threshold signal having a predetermined value to the power estimation signal.

* * * * *